(12) United States Patent
Linder

(10) Patent No.: US 6,363,151 B1
(45) Date of Patent: *Mar. 26, 2002

(54) METHOD AND SYSTEM FOR SUBSCRIBER AUTHENTIFICATION AND/OR ENCRYPTION OF ITEMS OF INFORMATION

(75) Inventor: Hermann Linder, Dorfen (DE)

(73) Assignee: Siemens Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/903,581

(22) Filed: Jul. 31, 1997

(30) Foreign Application Priority Data

Jul. 31, 1996 (DE) ......................... 196 30 920

(51) Int. Cl.[7] .............................. H04K 1/00; H04L 9/00
(52) U.S. Cl. ........................................ 380/247; 713/168
(58) Field of Search ................................ 455/410, 411, 455/432, 403, 422; 380/247, 278; 713/168

(56) References Cited

U.S. PATENT DOCUMENTS

| | | | |
|---|---|---|---|
| 5,377,267 A | * 12/1994 | Suzuki et al. ................ | 380/248 |
| 5,615,267 A | *  3/1997 | Lin et al. ...................... | 380/23 |
| 5,621,783 A | *  4/1997 | Lantto et al. ................. | 379/59 |
| 5,799,249 A | *  8/1998 | Kennedy et al. ............. | 455/411 |
| 5,839,076 A | * 11/1998 | Becker ......................... | 455/461 |
| 6,002,931 A | * 12/1999 | Yamaguchi et al. ......... | 455/433 |

FOREIGN PATENT DOCUMENTS

| | | |
|---|---|---|
| EP | 0 717 578 A2 | 6/1996 |
| JP | 07 59154 | 3/1995 |
| JP | 08 8899 | 1/1996 |

OTHER PUBLICATIONS

Beheim, "Safety first bei europaweiter Mobilkommunikation", Telcom Report, pp. 326–329.

Molva et al., "Authentication of Mobile Users", IEEE Network, pp. 26–34.

* cited by examiner

Primary Examiner—Gail Hayes
Assistant Examiner—Anthony DiLorenzo
(74) Attorney, Agent, or Firm—Schiff Hardin & Waite

(57) ABSTRACT

Security parameters (SPAR) are provided by the mobile radiotelephone network (PLMN) for subscribers of another network (CN) via an interface (DSS1+) connecting the two networks, without carrying out subscriber entries in at least one subscriber database of the mobile radiotelephone network for these subscribers in the mobile radiotelephone network. The subscribers of the other network thereby identify themselves with a subscriber identity module (SIM) of their subscriber station (UPTS, DM), and are installed in a subscriber database (DB) of the other network. The security parameters for the subscribers installed in the private network are requested via the interface, are provided by an authentification center (AC) of the mobile radiotelephone network and are transmitted to the private network via the interface. An entering of the subscriber in the subscriber database of the mobile radiotelephone network is omitted, which also has in particular the advantage that it is not necessary to assign mobile subscriber call numbers in the mobile radiotelephone network.

20 Claims, 2 Drawing Sheets

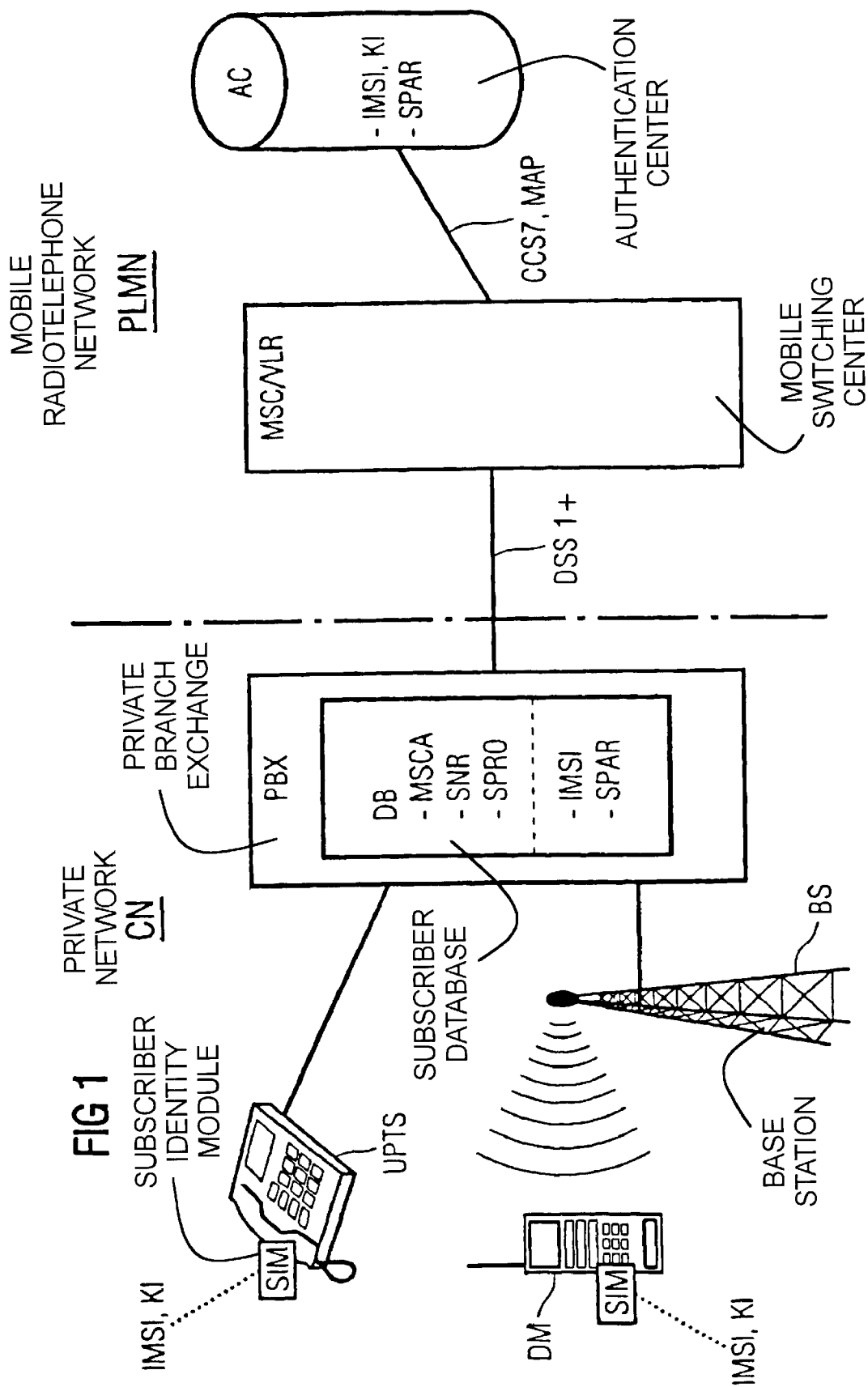

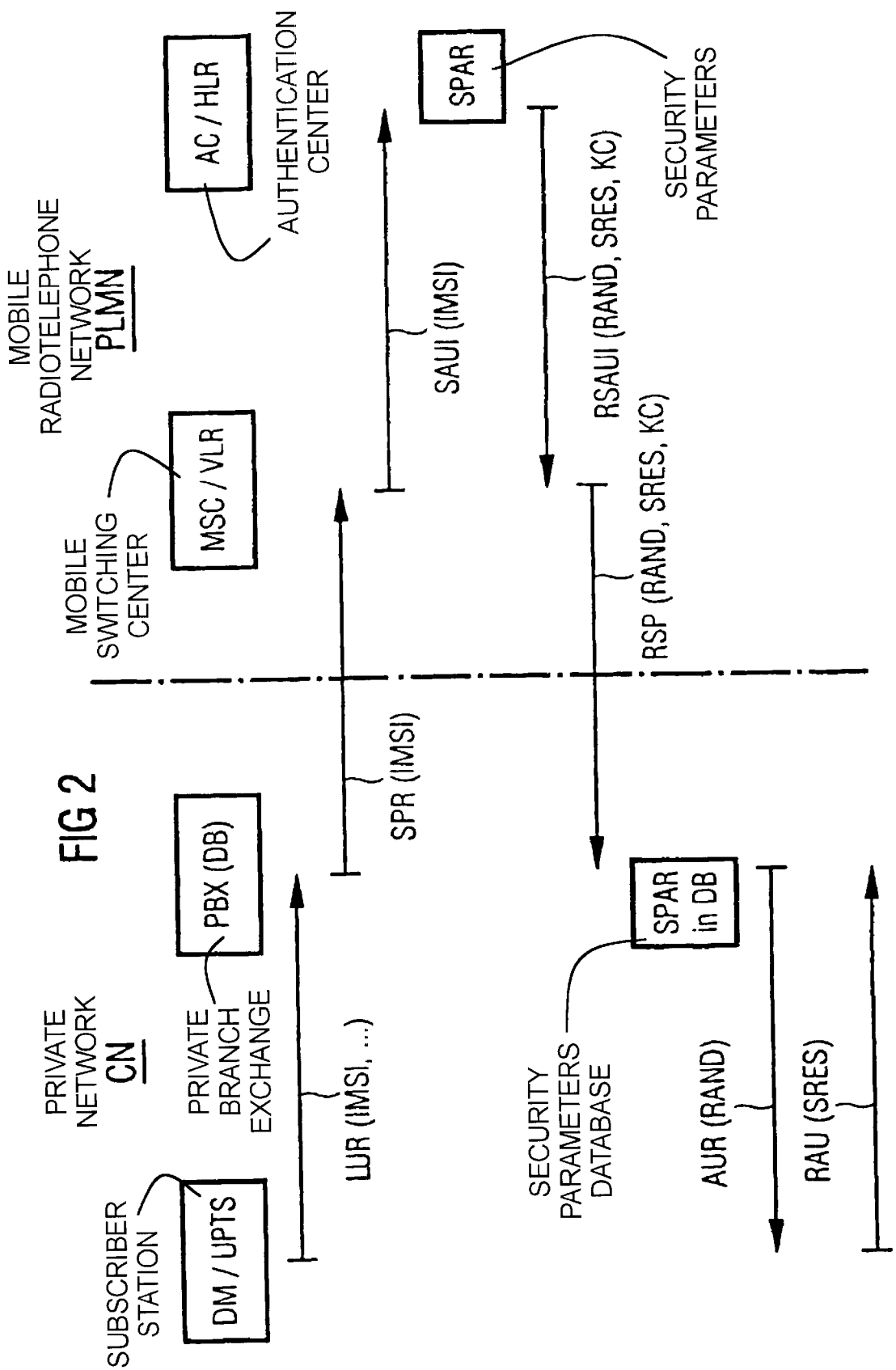

METHOD AND SYSTEM FOR SUBSCRIBER AUTHENTIFICATION AND/OR ENCRYPTION OF ITEMS OF INFORMATION

BACKGROUND OF THE INVENTION

The present invention concerns a method and system for subscriber authentification and/or encryption of items of information for use in a mobile radiotelephone network.

In the article "Safety First bei europaweiter Mobilkommunikation," telcom report 16 (1993), no. 6, pp. 326 to 329, a method and system is described for protecting subscriber data against unauthorized access and from misuse of items of personal subscriber information for mobile subscribers of a cellular digital mobile radiotelephone network according to the international GSM standard (Global System for Mobile Communication). The mobile subscribers, who can communicate across national borders in the networks of the various providers, thereby identify themselves to the respective network with a subscriber identity module, also called an SIM card, which is contained in the radiotelephone subscriber station. After receiving the SIM card, the mobile subscriber is registered in an authentification center, which respectively provides security parameters and security algorithms for protection of the subscriber data to the mobile subscribers. For this purpose, the authentification center is provided with a security box in which the security algorithms are implemented. In addition, there is also the familiar possibility of encrypting (ciphering) the items of information for the transmission.

Due to the high security relevance, the GSM security measures, in particular the security parameters and the security algorithms, are accessible only to the network operators who have agreed to the international mobile radiotelephone network standard in a common agreement ("Memorandum of Understanding"), and to infrastructure manufacturers. Thus, these security measures can be used only in mobile radio networks, and cannot be used in other networks, e.g. in private networks (corporate networks). An application between the GSM standard and another radiotelephone standard, e.g. the DECT standard (Digital Enhanced Cordless Telecommunication), or an application in a universal communication network (universal personal telecommunication, UPT) is not possible without problems, even if common agreements exist between a network operator of a GSM mobile radiotelephone network and another network operator concerning support of subscriber mobility (roaming) between the networks. There thus exist either agreements only between mobile radiotelephone networks that support the GSM standard, or networks of different radiocommunication standards are possible only through doubled subscriber entries in the subscriber databases of both networks, and thus different authentification methods.

SUMMARY OF THE INVENTION

It is an object of the present invention to provide a method and system for subscriber authentification and/or for encryption of items of information by which the security measures can also be applied, to the smallest possible outlay, in other networks respectively connected with the mobile radiotelephone network.

In general terms the present invention is a method for subscriber authentification and/or for encryption of items of information, in which mobile subscribers identify themselves to a mobile radiotelephone network with a subscriber identity module contained in a subscriber station and are installed in at least one subscriber database of the mobile radiotelephone network and are registered in an authentification center. The center respectively provides security parameters and security algorithms for the mobile subscribers, for the protection of the subscriber data. Subscribers of another network connected with the mobile radiotelephone network via an interface identify themselves with the subscriber identity module. They are set up in at least one subscriber database of the other network. The security parameters for the installed subscriber of the other network are requested via the interface, are provided by the authentification center of the mobile radiotelephone network and are transmitted to the other network via the interface, without the execution of a subscriber entry in the subscriber database of the mobile radiotelephone network. The subscriber authentification for the subscribers of the other network and/or the encryption of the items of information on the basis of the security parameters received from the mobile radiotelephone network are executed in this other network.

Advantageous developments of the present invention are as follows.

The authentification center that respectively provides the security parameters in the mobile radiotelephone network is determined by a subscriber identification that is read from the subscriber identity module by the subscriber station and is sent via the interface.

The security parameters received by the other network are entered into the subscriber database in addition to the subscriber data. The subscriber database is the home database of the subscribers registered in the other network.

Before additional sets of security parameters are made available, one or several sets of security parameters are respectively requested and transmitted via the interface, and the subscriber authentification and/or encryption is carried out.

The mobile radiotelephone network is a cellular mobile radiotelephone network according to the GSM standard, which network provides GSM security parameters for the subscribers of the other network.

Given the use of a radiotelephone subscriber station for the subscribers of the other network, the security algorithms contain measures for the encryption of the items of information to be sent via air between the radiotelephone subscriber station and a base station.

The present invention is also a system for subscriber authentification and/or for encryption of items of information, in which mobile subscribers identify themselves to a mobile radiotelephone network with a subscriber identity module contained in a subscriber station. They are installed in at least one subscriber database of the mobile radiotelephone network and are registered in an authentification center, from which security parameters and security algorithms for the mobile subscribers can respectively be provided for the protection of the subscriber data. The mobile radiotelephone network is connected via an interface with another network whose subscribers identify themselves with the subscriber identity module of their subscriber stations and are installed at least in a subscriber database of the other network. Means are provided in the other network that request security parameters for the installed subscriber of the other network via the interface; means are provided in the respective authentification center of the mobile radiotelephone network that provide the security parameters; means are provided in the mobile radiotelephone network that transmit the security parameters via the interface to the other network, without a subscriber entry in the subscriber database of the mobile radiotelephone network thereby being carried out. Means are provided in the other network that carry out the subscriber authentification for the subscribers of the other network and/or the encryption of the items of information on the basis of the security parameters received by the mobile radiotelephone network.

The security parameters are provided by the mobile radiotelephone network for subscribers of a different network via an interface connecting both networks, without carrying out subscriber entries for these subscribers in the mobile radiotelephone network in at least one subscriber database of the mobile radiotelephone network. The subscribers of the other network thereby identify themselves respectively with the subscriber identity module, and are installed at least in a subscriber database of the other network. The security parameters for the subscribers installed in the other network are requested via the interface, are provided by an authentification center of the mobile radiotelephone network and are transmitted to the other network via the interface. An entering of the subscriber in the subscriber database of the mobile radiotelephone network is omitted, which also, in particular, has the advantage that no mobile subscriber call number need be assigned in the mobile radiotelephone network, and thus no management of the subscribers of the other network need be carried out. On the basis of the security parameters supplied by the mobile radiotelephone network and received in the other network, the subscriber authentification for the subscribers registered in the other network and/or the encryption of the items of information is carried out. In this way, the other network, which for example represents a private network with private branch exchanges, can independently handle the security measures for protection against unauthorized access to subscriber data, and against misuse of individual subscriber data and/or for the encryption of the items of information, without this affecting the mobile radiotelephone network (with the exception of the transmission of the security parameters), and without the other network's having to implement the highly secret security algorithms for determining the security parameters in the other network.

It is thereby advantageous if at first at least one set of security parameters is requested via the interface and is transmitted, and the subscriber authentification or, respectively, encryption is carried out before a new request is initiated to the mobile radiotelephone network for the provision of additional sets of security parameters from the other network. The security parameters and security algorithms for subscriber authentification, and preferably also for encrypting items of information sent via air between a base station and a radiotelephone subscriber station, are both in case of communication of the subscriber via the other network (e.g., the private network supporting the DECT radiotelephone standard) and in the case of subscriber communication in which the subscriber changes his location from a region of the other network into the service area of the mobile radiotelephone network.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 shows a schematic diagram of the subscriber authentification in a private network connected to the mobile radiotelephone network, and FIG. 2 shows the message flow for subscriber authentification between the private network and the mobile radiotelephone network.

DESCRIPTION OF THE PREFERRED EMBODIMENTS

FIG. 1 shows the schematic diagram for subscriber authentification or, respectively, encryption of items of information in a private network CN that is connected via an interface DSS1+with a mobile radiotelephone network PLMN, e.g. with the mobile radiotelephone network according to the GSM standard. As is known, the cellularly constructed digital mobile radiotelephone network PLMN comprises a radio-oriented subsystem and a switching-oriented subsystem. The radiotelephone subscriber stations of the mobile subscribers, who are registered in a home subscriber database (home register) and, dependent on location, in a visitor subscriber database (visitor register) of the switching-oriented subsystem, thereby respectively communicate via an air interface with one of several base transceiver stations of the radio-oriented subsystem, and vice versa. The base transceiver stations serve a large number of radiotelephone cells, of which the mobile radiotelephone network PLMN is composed for the radiotelephone service of as many subscribers as possible.

The switching-oriented subsystem for carrying out switching-related and mobility-specific functions is connected to the radio-oriented subsystem. The switching-oriented subsystem comprises a plurality of mobile switching centers MSC with associated visitor registers VLR, in which the subscriber data of the subscribers currently located in a service area respectively served by the mobile switching center MSC are temporarily stored in decentralized fashion. The subscriber data of the mobile subscribers are thus stored in the visitor register VLR, which acts as a decentralized subscriber database in the mobile radiotelephone network PLMN, only so long as they are located in the respectively served service area. Besides the visitor registers VLR, the mobile radiotelephone network PLMN is provided with at least one home register HLR (not shown). All subscriber data of all mobile subscribers are centrally stored therein for the duration of the registration in the mobile radiotelephone network PLMN. An authentification center AC is connected with the home register HLR, which authentification center comprises a security box with a separate processor and a separate operating system. In the authentification center AC, the mobile subscriber is registered with a mobile subscriber identification IMSI assigned to him, whereby a secret subscriber key KI, stemming from the preparation of the SIM card, is also stored. The SIM card represents a subscriber identity module SIM with which the subscriber identifies himself to the mobile radiotelephone network PLMN.

After the identification of the subscriber with the subscriber identity module SIM, there ensues a subscriber authentification for checking the network access authorization of the mobile subscriber. For this purpose, security parameters SPAR are provided in the authentification center AC, and are used as input parameters for predetermined security algorithms (for example, security algorithm A3/A8, defined according to the international GSM standard), which in turn supply security parameters (e.g. SRES; see below) for authentification or, respectively, for encryption of the items of information (e.g. KC; see below) as output parameters. However, the network operators of the international GSM mobile radiotelephone network are not bound to these security algorithms, and can implement their own security algorithms. The security unit in the authentification center AC supplies a signal (SRES, Signed RESponse) as the result of the security algorithm A3, using a random number (RAND) and the stored parameters IMSI, KI. The subscriber identity module SIM likewise produces the signal (SRES, Signed Response) according to the security algorithm A3 implemented therein, on the basis of the previously transmitted random number and the stored parameters IMSI, KI. The two signals are compared with one another with respect to identity by a network installation of the mobile radiotelephone network PLMN, preferably by the mobile switching center MSC. If the two signals agree, the subscriber authentification has been carried out successfully. In the course of the authentification, the key (KC) for encrypting the information is calculated in the subscriber identity module SIM according to the security algorithm A8. For the communication of the individual installations of the mobile radiotelephone network PLMN, a central signaling system CCS7 (signaling system number 7) is provided, which comprises a mobile radiotelephone-specific user part MAP for handling the mobility-related functions.

The private network CN has at least one private branch exchange PBX, to which, via a base station BS, subscribers are wire-connected via subscriber stations UPTS or via a radiotelephone subscriber station DM, e.g. a dual-mode radiotelephone subscriber station suited for the GSM standard and for the DECT standard. The subscriber station UPTS thereby supports universal personal communication in a telecommunication network that serves wire-bound subscribers and/or mobile subscribers (Universal Personal Telecommunication, UPT). It is common to both subscriber stations UPTS, DM that the subscriber of the private network CN identifies himself to the network with the subscriber identity module SIM that is contained in the subscriber station or, respectively, is inserted into the subscriber station. The subscriber identity module stores the subscriber identification IMSI and the secret subscriber key KI for the subscriber. While the secret subscriber key KI is used only for subscriber authentification, e.g. according to the implemented security algorithm A3, the subscriber identification IMSI also serves to determine the authentification center AC in the mobile radiotelephone network PLMN, which center is to provide the security parameters SPAR for the authentification and/or encryption of the subscribers of the private network CN. The private network consists for example of a corporate network with several locations that are networked among one another, and of private branch exchanges PBX that serve subscribers via lines or radio paths, e.g. through the connection of DECT wireless systems.

The private branch installation PBX respectively has a subscriber database DB in which the subscriber data of the respectively registered subscribers are stored. The subscriber data include for example an address MSCA for selecting the mobile switching center MSC that can be reached via the interface DSS1+, the subscriber number SNR, a service profile SPRO for determining the telecommunication services that can respectively be used by the subscriber, the subscriber identification IMSI, received from the subscriber identity module SIM in the subscriber station UPTS, DM for determining the authentification center AC, and the security parameters SPAR supplied by the authentification center AC, on the basis of which parameters the authentification procedure and/or the encryption procedure can be handled independently in the private network CN. Via the interface DSS1+that exists between the private branch exchange PBX and the mobile switching center MSC, an interface protocol is used that enables the exchange of the security parameters SPAR, including mobility-specific and security-specific functions. The interface DSS1+makes use for example of an existing protocol for the connection of private branch exchanges to a mobile switching center, expanded by the messages for the transmission of the security parameters SPAR. Thus, for example, the security algorithms and provided security parameters in the private network CN can cause additional measures to be taken for the encryption of the items of information (e.g. speech and data) to be sent via air between the radiotelephone subscriber station DM and the base station BS. For this purpose, the separate key (KC) for the air interface is required, which is requested by the mobile radiotelephone network as a part of the security parameters SPAR and is provided by the authentification center AC or, respectively, is received via the interface DSS1+.

FIG. 2 shows the sequence for subscriber authentification of subscribers registered in the private network CN by transmission of security parameters SPAR from the mobile radiotelephone network, without a subscriber entry in a home register HLR of the mobile radiotelephone network PLMN being carried out for this purpose. After the identification of the subscriber in the subscriber station DM or, respectively, UPTS, a message LUR, containing among other things the subscriber identification IMSI, is sent to the private branch exchange PBX, which registers the subscriber in the subscriber database DB by entering his subscriber data in the subscriber database DB. The message LUR (Location Update Request) is sent by the subscriber station whenever a location registration is necessary, either for the first time or upon transition into the region of a different private branch exchange.

A message SPR with the subscriber identification IMSI as message content is signaled via the interface according to FIG. 1 to the mobile switching center MSC by the private branch exchange PBX of the private network CN. A request is sent for transmission of the security parameters for the subscriber authentification of the subscribers registered in the private network CN and/or for the encryption of the items of information in the course of the authentification. The mobile switching center MSC thereupon sends a message SAUI with the subscriber identification IMSI as message content to the corresponding authentification center AC. With the message SAUI (Send Authentification Info), the security parameters SPAR calculated and provided in the authentification center are requested. The request of the security parameters SPAR thereby ensues without application supplying a subscriber entry, which standardly contains the identification IMSI. In particular, it is also the case that no mobile subscriber call number (MSISDN) is assigned, as is standard for the mobile GSM subscribers in the network. The subscriber of the private network CN is thus registered only in the private branch exchange PBX responsible for him as a subscriber, while this subscriber does not exist in the home register HLR, and for him only security parameters SPAR from the authentification center AC are stored as transient data and are sent to the private branch exchange PBX, which, as the home private branch exchange, registers the subscriber.

Subscriber identity modules SIM can thus be sent to the network operators of other networks, e.g. of private networks CN, which must provide only for an entering of the subscriber in the corresponding subscriber database—in the present example, in the subscriber database DB of the private branch exchange PBX. The SIM cards given to users of the subscriber stations by the network operator, or also by a service provider, are used by the subscribers in their radiotelephone subscriber stations DM or, respectively, subscriber stations UPTS, in order to identify themselves to the respective network. Let it be assumed in the present example that a random number RAND, a key KC for encrypting the items of information during the radiotelephone transmission, and the signal SRES (Signed Response), required for checking the authorization of the subscriber identity module SIM in relation to the network, are provided by the authentification center AC as security parameters required for the subscribers' access to the private network CN, and are transmitted to the mobile switching center MSC by the authentification center in a message RSAUI (Result Send Authentification Info). One or several sets of security parameters are thereby preferably provided, which are first processed in the private network CN for the authentification of subscribers, before additional sets of security parameters are requested. Several and different sets of security parameters can thus be fetched by the authentification center of the mobile radiotelephone network, and are successively processed in the private network, in the present example by the private branch exchange PBX with the associated subscriber database DB. After receiving the message RSAUI, the mobile switching center MSC sends the incoming parameters RAND, SRES, KC into the private network via the interface, in a message RSP (Result Security Parameter), where they are stored in the subscriber database DB of the private branch exchange PBX as security parameters SPAR. This procedure is repeated each time the authentification center AC provides and transmits a set of security parameters that were previously requested. The subscriber authentification for the subscribers of the private network CN registered in the private branch exchange PBX subsequently ensues automatically, in that the private branch exchange PBX sends out a message AUR, with the random number RAND as the message content, to the respective subscriber station DM or, respectively, UPTS. For the encryption of the items of information, the separate key KC is used either by the base station connected to the private branch exchange PBX or by the subscriber station to send out encrypted useful information or signaling information.

With the message AUR, the private branch exchange PBX signals the request for authentication, which is answered by the subscriber station DM or, respectively, UPTS with the back-transmission of a message RAU with the signal SRES as message content. On the basis of the incoming random number RAND, the respective subscriber station calculates the signal SRES using the secret subscriber key stemming from the pre-processing of the SIM card, which signal is compared by the private branch exchange for identity with the signal SRES stored in the subscriber database DB. If the two signals agree, the subscriber authentification of the subscriber registered in the private network CN has been carried out successfully, without requiring the implementation of a security algorithm in the network of the subscriber. Separate authentification procedures for mobile subscribers of the mobile radiotelephone network (PLMN) and for subscribers of another network CN are omitted. The security parameters (in the present example, the GSM security parameters for the subscriber authentification of the subscribers of the private network CN) are previously requested and transmitted, but without the carrying out of a subscriber entry for the subscribers of the private network in a subscriber database of the mobile radiotelephone network. The present example relates to the preparation of GSM security parameters that are processed according to GSM security algorithms, but other security parameters and security algorithms for the subscriber authentification of the subscribers of other networks or, respectively, for the encryption of the items of information are also possible. For the transmission of the security parameters, an interface connection with an interface protocol between the mobile radiotelephone network and every other network must be provided.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A method for at least one of subscriber authentication and encryption of items of information, comprising the steps of:

identifying mobile subscribers to a mobile radiotelephone network with a subscriber identity module contained in a subscriber station, using a first public, commercial authentication standard;

installing said mobile subscribers in at least one subscriber database of the mobile radiotelephone network and registering in an authentication center, which center respectively provides security parameters and security algorithms for the mobile subscribers, for protection of subscriber data of the mobile subscribers;

identifying with a subscriber identity module subscribers of a further network, independent of but connected to the mobile radiotelephone network via an interface, said further network using a second pubic, commercial authentication standard different from said first public, commercial authentication standard;

installing the identified subscriber in at least one subscriber database of the further network;

requesting the security parameters for the installed subscriber of the further network via the interface;

providing the security parameters by the authentication center of the mobile radiotelephone network;

transmitting the security parameters to the further network via the interface, the steps of requesting, providing and transmitting security parameters occurring without the execution of a subscriber entry in the subscriber database of the mobile radiotelephone network;

executing in the further network at least one of subscriber authentication for the subscribers of the further network and encryption of items of information based on the security parameters received from the mobile radiotelephone network.

2. The method according to claim 1, wherein the authentification center that provides the security parameters in the mobile radiotelephone network is identified by subscriber identification that is read from the subscriber identity module by the subscriber station and that is sent via the interface.

3. The method according to claim 1, wherein the security parameters received from the mobile radiotelephone network are entered into the subscriber database of the further network in addition to the subscriber data.

4. The method according to claim 3, wherein the subscriber database is a home database of subscribers registered in the further network.

5. The method according to claim 2 wherein before additional sets of security parameters are made available, at least one set of security parameters is requested and transmitted via the interface, and at least one of subscriber authentification and encryption is carried out.

6. The method according to claim 1, wherein the mobile radiotelephone network is a cellular mobile radiotelephone network according to a GSM (Global System for Mobile Communication) standard, which network provides GSM security parameters for the subscribers of the further network.

7. The method according to claim 1, wherein given the use of a radiotelephone subscriber station for the subscribers of the further network, the security algorithms have measures for encryption of items of information to be sent via air between the radiotelephone subscriber station and a base station.

8. A system for at least one of subscriber authentication and encryption of items of information, comprising:

a subscriber identity module with which subscribers identify themselves to a mobile radiotelephone network, using a first public, commercial authentication standard, the module being in a subscriber station;

at least one subscriber database of the mobile radiotelephone network in which the subscribers are installed;

an authentication center in which the subscribers are registered, from which security parameters and security algorithms for the mobile subscribers are provided for protection of subscriber data;

a further network, independent of said mobile radiotelephone network, whose subscribers identify themselves with a respective subscriber identity module of their subscriber stations, the subscribers being installed at least in a subscriber database of the further network, said further network using a second public, commercial authentication standard different authentication standard;

an interface connecting said mobile radiotelephone network and said further network;

in the further network, means for requesting security parameters for an installed subscriber of the further network via the interface;

in the respective authentication center of the mobile radiotelephone network, means for providing the security parameters;

in the mobile radiotelephone network, means for transmitting the security parameters via the interface to the further network, without carrying out a subscriber entry in the subscriber database of the mobile radiotelephone network;

in the further network, means for carrying out subscriber authentication for the subscribers of the further network and encryption of the items of Information based on the security parameters received by the mobile radiotelephone network.

9. A method for at least one of subscriber authentication and encryption of items of information, comprising the steps of:

identifying mobile subscribers to a mobile radiotelephone network with a subscriber identity module contained in a subscriber station, using a first public, commercial authentication standard;

installing said mobile subscribers in at least one subscriber database of the mobile radiotelephone network and registering in an authentication center, which center respectively provides security parameters and security algorithms for the mobile subscribers, for protection of subscriber data of the mobile subscribers;

identifying with a subscriber identity module subscribers of a further network independent of but connected to the mobile radiotelephone network via an interface, said further network using a second public, commercial authentication standard different from said first public, commercial authentication standard;

setting up the identified subscriber in at least one subscriber database of the further network;

requesting the security parameters for the installed subscriber of the further network via the interface;

providing the security parameters by the authentication center of the mobile radiotelephone network;

transmitting the security parameters to the further network via the interface, the steps of requesting, providing and transmitting security parameters occurring without the execution of a subscriber entry in the subscriber database of the mobile radiotelephone network;

executing in the further network subscriber authentication for the subscribers of the further network and/or the encryption of items of information based on the security parameters received from the mobile radiotelephone network; and requesting, before additional sets of security parameters are made available, at least one set of security parameters, the at least one set of security parameters being transmitted via the interface, and the subscriber authentication and encryption being carded out.

10. The method according to claim 9, wherein the authentification center that provides the security parameters in the mobile radiotelephone network is identified by subscriber identification that is read from the subscriber identity module by the subscriber station and that is sent via the interface.

11. The method according to claim 9, wherein the security parameters received from the mobile radiotelephone network are entered into the subscriber database of the further network in addition to the subscriber data.

12. The method according to claim 11, wherein the subscriber database is a home database of subscribers registered in the further network.

13. The method according to claim 9, wherein the mobile radiotelephone network is a cellular mobile radiotelephone network according to a GSM (Global System for Mobile Communication) standard, which network provides GSM security parameters for the subscribers of the further network.

14. The method according to claim 9, wherein given the use of a radiotelephone subscriber station for the subscribers of the further network, the security algorithms have measures for encryption of items of information to be sent via air between the radiotelephone subscriber station and a base station.

15. A system for at least one of subscriber authentification and encryption of items of information, comprising:

a subscriber identity module with which subscribers identify themselves to a mobile radiotelephone network, using a first public, commercial authentication standard, the module being in a subscriber station;

at least one subscriber database of the mobile radiotelephone network in which the subscribers are installed;

an authentication center in which the subscribers are registered, from which security parameters and security algorithms for the mobile subscribers are provided for protection of subscriber data;

a further network independent of said mobile radiotelephone network, whose subscribers identify themselves with a respective subscriber identity module of their subscriber stations, the subscribers being installed at least in a subscriber database of the further network, said further network using a second public, commercial authentication standard different from said first public, commercial authentication;

in the further network, means for requesting security parameters for an installed subscriber of the further network via the interface;

in the respective authentication center of the mobile radiotelephone network, means for providing the security parameters;

in the mobile radiotelephone network, means for transmitting the security parameters via the interface to the further network, without carrying out a subscriber entry in the subscriber database of the mobile radiotelephone network;

in the further network, means for carrying out subscriber authentication for the subscribers of the further network or encryption of the items of information based on the security parameters received by the mobile radiotelephone network, and for requesting, before additional sets of security parameters are made available, at least one set of security parameters, the at least one set of security parameters being transmitted via the interface, and the subscriber authentication and encryption being carried out.

16. A method for at least one of subscriber authentification and encryption of items of information, comprising the steps of:

identifying mobile subscribers to a mobile radiotelephone network with a subscriber identity module contained in a subscriber station;

installing said mobile subscribers in at least one subscriber database of the mobile radiotelephone network and registering in an authentification center, which center respectively provides security parameters and security algorithms for the mobile subscribers, for protection of subscriber data of the mobile subscribers;

identifying with a subscriber identity module subscribers of a further network connected to the mobile radio telephone network via an interface, said further network using a different authentication standard than said mobile radiotelephone network;

setting up the identified subscriber in at least one subscriber database of the further network;

requesting the security parameters for the installed subscriber of the further network via the interface;

providing the security parameters by the authentification center of the mobile radiotelephone network;

transmitting the security parameters to the further network via the interface, the steps of requesting, providing and transmitting security parameters occurring without the execution of a subscriber entry in the subscriber database of the mobile radiotelephone network;

executing in the further network subscriber authentification for the subscribers of the further network and/or the encryption of items of information based on the security parameters received from the mobile radiotelephone network; and requesting, before additional sets of security parameters are made available, at least one set of security parameters, the at least one set of security parameters being transmitted via the interface, and the subscriber authentification or encryption being carried out.

17. The method according to claim 16, wherein the authentification center that provides the security parameters in the mobile radiotelephone network is identified by subscriber identification that is read from the subscriber identity module by the subscriber station and that is sent via the interface.

18. The method according to claim 16, wherein the subscriber database is a home database of subscribers registered in the further network.

19. The method according to claim 16, wherein the mobile radiotelephone network is a cellular mobile radiotelephone network according to a GSM (Global System for Mobile Communication) standard, which network provides GSM security parameters for the subscribers of the further network.

20. The method according to claim 16, wherein given the use of a radiotelephone subscriber station for the subscribers of the further network, the security algorithms have measures for encryption of items of information to be sent via air between the radiotelephone subscriber station and a base station.

* * * * *